United States Patent [19]
Kegelmeyer, Jr.

[11] Patent Number: 5,661,820
[45] Date of Patent: Aug. 26, 1997

[54] METHOD AND APPARATUS FOR DETECTING A DESIRED BEHAVIOR IN DIGITAL IMAGE DATA

[76] Inventor: W. Philip Kegelmeyer, Jr., 11755 Shadow Dr., Dublin, Calif. 94568

[21] Appl. No.: 421,603

[22] Filed: Apr. 13, 1995

Related U.S. Application Data

[62] Division of Ser. No. 380,474, Jan. 30, 1995, which is a continuation of Ser. No. 983,218, Nov. 30, 1992, abandoned.

[51] Int. Cl.$^6$ ........................................................ G06K 9/00
[52] U.S. Cl. .................................................. 382/226; 382/128
[58] Field of Search ................................. 382/224, 225, 382/226, 228, 128, 133, 131, 260, 199

[56] References Cited

U.S. PATENT DOCUMENTS

| | | | |
|---|---|---|---|
| 4,340,911 | 7/1982 | Kato et al. | 358/280 |
| 4,376,932 | 3/1983 | Cassada | 382/226 |
| 4,798,215 | 1/1989 | Turner | 128/804 |
| 4,875,478 | 10/1989 | Chen | 128/303 B |
| 4,905,150 | 2/1990 | Aichinger et al. | 364/413.26 |
| 4,907,156 | 3/1990 | Doi et al. | 364/413.13 |
| 4,961,231 | 10/1990 | Nakayama | 382/21 |
| 4,961,425 | 10/1990 | Kennedy et al. | 128/653 R |
| 5,078,142 | 1/1992 | Siczek et al. | 128/653.1 |
| 5,133,020 | 7/1992 | Giger et al. | 382/6 |
| 5,263,097 | 11/1993 | Katz et al. | 382/225 |
| 5,394,484 | 2/1995 | Casey et al. | 382/226 |

OTHER PUBLICATIONS

"Automated Visual Quality Evaluation of CVD Film" by W.P. Kegelmeyer, Jr. et al. reprinted from Applications of Artificial Intelligence X: Machine Vision and Robotics, 22–24 Apr. 1992, Orlando, Fl, vol. 1708.

"Mammogram Inspection by Computer" by W. Spiesberger, 1979 IEEE.

"Computerized Quantification of Breast Duct Patterns" by A. Shadagopan et al., Diagnostic Radiology, Jun. 1982, vol. 143, No. 3.

"Texture Classification Using Averages of Local Pattern Matches" by Pietikainen et al., 1982 IEEE.

"Automated Detection of Breast Tumors Using the Asymmetry Approach" by Lau et al., Computer and Biomedical Research 24, pp. 273–295 (1991).

"On Techniques for Detecting Circumscribed Masses in Mammograms" by S. Lai et al., IEEE Transactions on Medical Imaging, vol. 8, No. 4, Dec. 1989.

"Toward Reliable Measurements of Breast Parenchymal Patterns" by C. Kimme–Smith et al., Proceedings, 6th Conference on Computer Applications in Radiology & Computer/Aided Analysis of Radiology Images, Jun. 18–21, 1979.

"Supervised Textured Image Segmentation Using Feature Smoothing and Probabilistic Relaxation Techniques" by Hsiao et al., IEEE Transaction on Pattern Analysis and Machine Intelligence, vol. II, No. 12, Dec. 1989.

"Investigation of Methods for the Computerized Detection and Analysis of Mammographic Masses" by M. Giger et al., SPIE vol. 1233 Medical Imaging IV: Image Processing (1990).

(List continued on next page.)

Primary Examiner—Yon J. Couso
Attorney, Agent, or Firm—Kurt C. Olsen; Timothy D. Stanley

[57] ABSTRACT

A method for detecting stellate lesions in digitized mammographic image data includes the steps of prestoring a plurality of reference images, calculating a plurality of features for each of the pixels of the reference images, and creating a binary decision tree from features of randomly sampled pixels from each of the reference images. Once the binary decision tree has been created, a plurality of features, preferably including an ALOE feature (analysis of local oriented edges), are calculated for each of the pixels of the digitized mammographic data. Each of these plurality of features of each pixel are input into the binary decision tree and a probability is determined, for each of the pixels, corresponding to the likelihood of the presence of a stellate lesion, to create a probability image. Finally, the probability image is spatially filtered to enforce local consensus among neighboring pixels and the spatially filtered image is output.

46 Claims, 7 Drawing Sheets

OTHER PUBLICATIONS

"An Iterative Growing and Pruning Algorithm for Classification Tree Design" by S. Gelfand et al., IEEE Transactions on Pattern Analysis and Machine Intelligence, vol. 13, No. 2, Feb. 1991.

"A Computer Analysis of Mammographic Microcalcifications: Global Approach" by S. Fox et al., 1980 IEEE.

"Algorithm for the Detection of Fine Clustered Calcifications on Film Mammograms" by F. Fam et al., Radiology, vol. 169, No. 2, pp. 333–337.

"Image Feature Analysis and Computer–Aided Diagnosis in Digital Radiology" by H. Chan et al., Med. Phys. 14(4), Jul./Aug. 1987, pp. 538–548.

"Automatic Computer Detection of Clustered Calcifications in Digital Mammograms" by D.H. Davis et al., Phys. Med. Biol., 1990, vol. 35, No. 3, 1111–1118.

"An Approach to Automated Detection of Tumors in Mammograms" by Brzakovic et al., IEEE Transactions on Medical Imaging, vol. 9, No. 3, Sep. 1990.

"Breast Lesion Classification by Computer and Xeroradiograph" by L. Ackerman, Cancer, Oct. 1972, vol. 30, No. 4, pp. 1025–1035.

"Combining Cues for Mammographic Abnormalities" by S. Astley et al., Image and Vision Computing, vol. 10, No. 5, Jun. 1992.

"Computer–Assisted Analysis of Mammographic Clustered Calcifications" by Messrs. Freundlich, Hunter, Seeley, D'Orsi and Sadowsky; Clinical Radiology (1989), pp. 295–298.

"Classification of Breast Tissue by Texture Analysis" by P. Miller and S. Astley; Image and Vision Computing; vol. 10, No. 5, Jun. 1992; pp. 277–282.

THREE FEATURES --- A, B, C
FOUR CLASSES ---- w, x, y, z

METHOD AND APPARATUS FOR DETECTING A DESIRED BEHAVIOR IN DIGITAL IMAGE DATA

This application is a divisional of application Ser. No. 08/380,474, filed on Jan. 30, 1994, now pending which is a rule 62 continuation of application Ser. No. 07/983,218 filed Nov. 30, 1992, now abandoned; the entire contents of which are hereby incorporated by reference.

The present application is directed to a method and apparatus for detecting a desired behavior ("behavior" referring to any object, characteristic appearance, abnormality, etc. detectable within the digital image data) in digital image data. More particularly, the present application is directed to a method and apparatus for detecting stellate lesions in mammograms.

BACKGROUND OF THE INVENTION

The visual signs for which radiologists search during mammographic screenings for breast cancer have been codified into three basic categories. Namely, circumscribed lesions, microcalcifications and stellate lesions. Of these, stellate lesions are arguably the most important due to the fact that most breast carcinomas are first indicated by stellate lesions and that they are so often malignant that there is only one rare case where they do not immediately require biopsy. Stellate lesions are also the most subtle and varied in appearance. Of the three classes, they are most difficult to detect in that they are often indicated only by subtle architectural distortions.

The problem of detection of these radiographic signs (in fact, the problem of pattern recognition in images in general) has usually been divided into two parts. The first part is the question of individual features, the image characteristics one uses as low level clues as to the presence or absence of the pattern in question. The second is the information calculus, namely the means by which the clues are assembled into a decision concerning the existence of a pattern.

A common approach in previous detection systems was to put most of the effort into the low-level detection of abnormalities, and to use a series of heuristics to make the final decision. Some heuristics were procedural, implemented by various thresholds and tests in the code implementing the basic algorithm, or by the subjective insertion of decision boundaries on statistical information extracted from image data.

Traditionally, a difficulty with heuristic methods are that they lack robustness as the pool of cases to be classified increases. Accordingly, prior systems put a fair amount of effort into the application of statistical methods to this problem with the techniques ranging from parametric conditional probability classification, to K nearest neighbors, to a non-parametric quadratic classifier. All of these investigations, while somewhat successful, labored under some constraints. The parametric approaches necessarily made assumptions which had not actually held (Gaussian conditional probability model or the dependence of low level features) and the non-parametric work had been restricted to the classification of already detected lesions or large sub-images of the mammogram.

Although not utilized in prior stellate lesion detection systems, other pattern classification systems, for detection of military targets for example, utilized binary decision trees. Bayesian hypothesis detection was, and still is, the optimal way to perform pattern recognition from features of images. However, Bayesian approaches require extensive knowledge about the probability distribution functions of each of the features. This data is usually found to be unavailable in practical problems and is certainly unavailable in the case of mammographic screening. Thus, such approaches were never utilized in detecting stellate lesions in digitized mammographic data.

Binary decision tree (BDT) classification methods, however, provide a means of approximating the optimal Bayesian classification role for a given situation and result in decision trees such as that shown in FIG. 1. The decision tree included a plurality of nodes 1, for example, shown in FIG. 1, including terminal nodes 2, for example, shown in FIG. 1. At each node, one of the features in a vector was compared to a threshold which moved the vector down the appropriate branch of the tree. This continued until it arrived at a terminal node which was assigned a classification. FIG. 1 is an example of a simple known BDT which is merely shown for exemplary purposes. It should be noted, however, that in known BDTs, a practical tree often contained hundreds of nodes.

The control parameters of each node of the known BDTs were chosen by simply determining the feature and threshold which best separated the current data, where the quality of separation was determined by some impurity measure. This process was then repeated, recursively partitioning the remaining training samples, until some stopping criteria was met. This recursive selection of the best possible partition was, and still is, one of the advantages of the BDT approach, namely its capacity for automatic feature selection data reduction.

An example of the training phase of a known BDT will now be described with reference to FIGS. 2. Initially, in the first step, 4 of FIG. 2, image data of reference images are obtained. By utilizing reference images, a binary decision tree could be grown utilizing data for which the truth was already known.

The second step, 6 of FIG. 2, was to determine regions of interest for each of the plurality of reference images. This was a type of crude guess done on each reference image done by a crude algorithm.

In the third step, 8 of FIG. 2, features for each of the region of interest windows would then be calculated. However, if the region of interest windows obtained were incorrect, the data was lost forever.

Finally, a binary decision tree was calculated, including intermediate and terminal nodes. A Yes/No classification was assigned to each of the terminal nodes. Each terminal node was assigned a classification of either containing the desired behavior or not. To produce each Yes/No classification at each terminal node, a terminal node population mix was used. If, when growing the tree, case A came up forty times, case B twenty-five times, and case C ten times, then case A would be selected for the terminal node. This completed the known training phase for developing a binary decision tree.

Application of the known binary decision tree worked similar to the training phase. The various factors in the binary decision tree could then be manipulated to decide optimal vectors which would be terminal nodes. Each terminal node was classified as either Yes or No, either being assigned a binary one or zero, for example.

Problems of known binary decision trees included that of the potential loss of statistical significance. In the known binary decision trees, it was important to maintain a binary decision tree as large as possible, and to prune the BDT in order to maintain statistical significance.

A further problem with known binary decision trees was that there was not always enough data to ensure accuracy. If a feature or object desired to be detected in a digital image was very small within the image data and only a random sample of data (one out of every thirty, for example) was obtained from region of interest windows used in creating the binary decision tree, the chance of creating a faulty BDT became more probable.

SUMMARY OF THE INVENTION

One object of the present invention is the creation of an apparatus for detecting a desired behavior in digital image data.

A further object of the present invention is the creation of a method and apparatus for the automatic detection of stellate lesions in digitized mammograms.

A still further object of the present invention is to extract image features from the known images, use them to grow a binary decision tree and use those trees to label each pixel within the mammogram with its probability of containing an abnormality.

A yet still further object of the present invention is to create a method and apparatus using, as a primary feature for the detection of stellate lesions, ALOE (analysis of local oriented edges), which is derived from an analysis of the standard deviation of a histogram of edge orientations in local windows.

Another object of the present invention is to use other features, based on the Laws texture energy measures, for example, which have been developed to respond to normal tissue and thus improve any false alarm performance of the method and apparatus of the present application using the ALOE feature.

Yet another object of the present invention is the creation of a method for detecting a desired behavior in the digital image data.

Yet still another object of the present invention is the creation of an improved method and apparatus utilizing binary decision trees to create a probability image.

One further object of the present invention is to use BDTs in stellate lesion detection because they have a compact representation and are computationally efficient when used for classification, operating at essentially a constant speed, independent of the number of training vectors. This is particularly important in the case of mammographic screening, as a single 4-view case can contain twelve million pixels, each classifiable by being dropped down the BDT.

One still further object of the present invention is the creation of a method and apparatus for detecting a desired behavior in digital image data, wherein one of a plurality of features calculated for each of a plurality of pixels for input into a binary decision tree is a feature capturing radial texture of the image.

One yet still further object of the present invention is the creation of a method and apparatus for detecting a desired behavior in a digital image data utilizing radial texture and degree of orientation heterogeneity to identify the presence or absence of the desired behavior.

Another still further object of the present invention is the creation of a method and apparatus for renormalization of resubstitution error rate in a binary decision tree in order to allow probabilistic, rather than crisp classifications of image pixels during application of the binary decision tree.

Some of the objects of the present application are fulfilled by providing a method for detecting a desired behavior in digital image data, comprising the steps of:

(a) inputting digital image data;

(b) accessing, for each of a plurality of pixels of the digital image data, digital image data of each pixel and pixels surrounding each of the plurality of pixels in predetermined window dimensions;

(c) computing edge orientation values of the accessed digital image data, for each of the plurality of pixels;

(d) histogramming, for each of the plurality of pixels, the computed edge orientation values;

(e) computing a standard deviation of each histogram; and (f) identifying a presence of the desired behavior in each of the plurality of pixels for which a standard deviation of the orientation histogram indicates a characteristic degree of orientation heterogeneity.

Some of the objects of the present invention are further fulfilled by providing an apparatus for detecting a desired behavior within digital image data of a plurality of pixels comprising storage means for prestoring a plurality of reference images; calculating means for calculating a plurality of features for each of a plurality of pixels for each of the reference images; computing means for creating a binary decision tree from random samples of the pixels from each of the reference images; the calculating means further calculating a plurality of features for each of the pixels of the digital image data; input means for inputting each of the plurality of features for each pixel into the binary decision tree; determining means for determining a probability corresponding to the likelihood of the presence of the desired feature for each of the pixels of the digital image data based upon binary decision tree results to create a probability image; filtering means for spatial filtering the probability image to enforce local consensus within the probability image; and output means for outputting the spatially filtered image.

Some of the objects of the present application are still further fulfilled by providing an apparatus wherein at least one of the plurality of features for each of the pixels of the digital image data is calculated by a calculating means including an accessing means for accessing, for each of a plurality of pixels of the digital image data, digital image data of each pixel and pixels surrounding each of the plurality of pixels in predetermined window dimensions; orientation means for computing edge orientation values of the accessed digital image data, for each of the plurality of pixels; histogramming means for histogramming for each of the plurality of pixels, the computed edge orientation values; and computing means for computing a standard deviation of each histogram to create a feature for identifying a probable presence of the desired behavior in each of the plurality of pixels in which the standard deviation of the orientation histogram indicates a characteristic degree of orientation heterogeneity.

These and other objects of the present application will become more readily apparent from the detailed description hereinafter. However, it should be understood that the detailed description and specific examples, while indicating preferred embodiments of the invention, are given by way of illustration only since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DETAILED DESCRIPTION OF THE PREFERRED EMBODIMENTS

Figure 4:
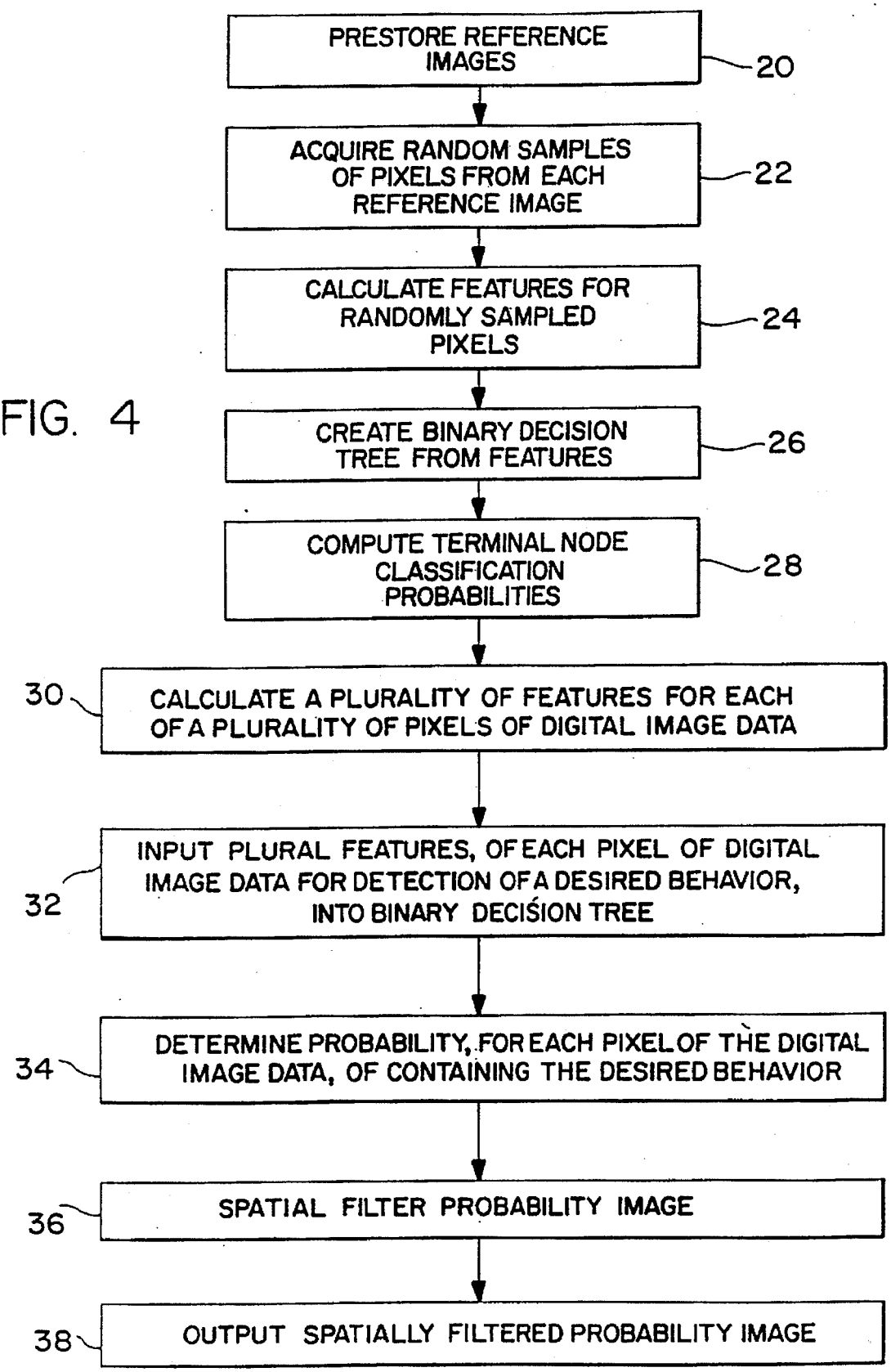
FIG. 4 illustrates one preferred embodiment of the present invention for creation of a probability image.

FIG. 4 is a flow chart illustrating one preferred embodiment of the present application for detecting a desired behavior ("behavior" referring to any object, abnormality, characteristic appearance, etc., detectable within the digital image data) in digital image data, such as a stellate lesion in digital image data from a mammogram. Description of the preferred embodiment of the present application will be directed to the detection of stellate lesions in digitized mammographic image data. However, it should be noted that the process and corresponding apparatus can be used for detection of any desired behavior, such as an abnormality or object, within digital image data.

In the first step, 20 of FIG. 4, reference image data is prestored. Such reference image data can be that similar data shown in FIG. 3 of the present application, wherein each pixel of the image data in each reference image is known to contain cancerous or non-cancerous information (or any other indication of the desired behavior for detection). This data will be used in building a binary decision tree.

Figure 1:
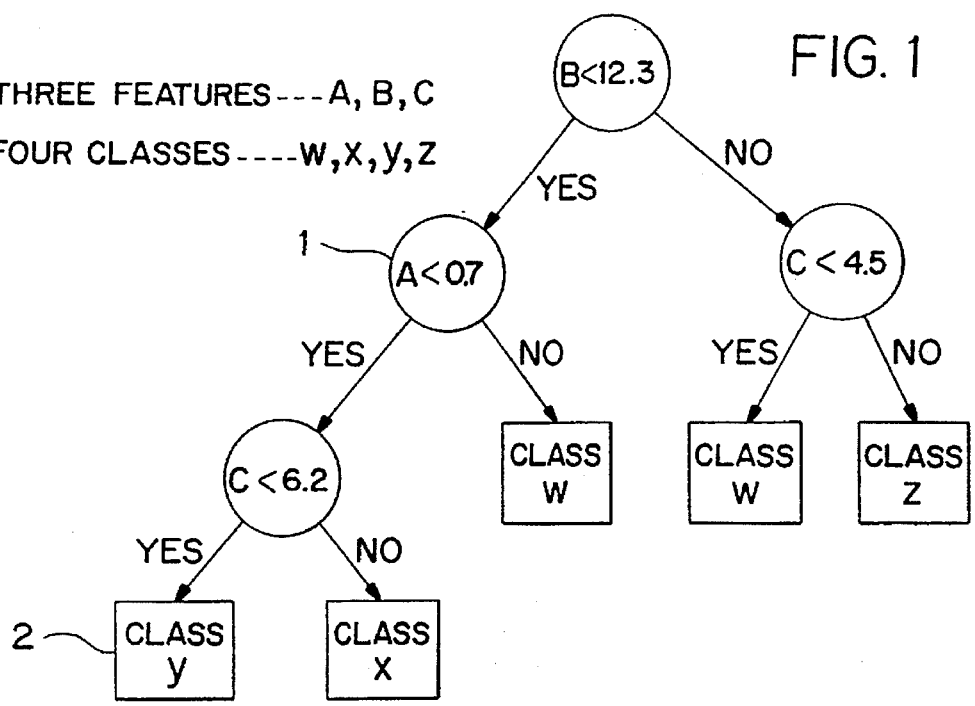
FIG. 1 illustrates an example of a binary decision tree.
Figure 2:
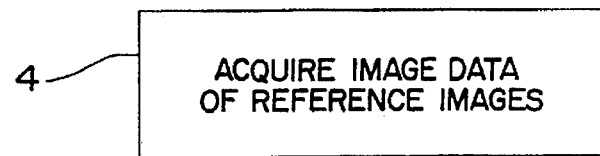
FIG. 2 illustrates a method for creating a binary decision tree.
Figure 2:
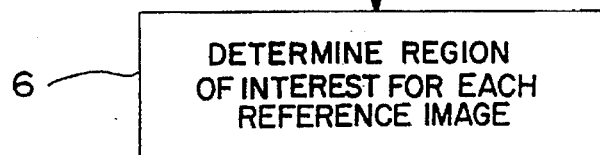
Figure 2:
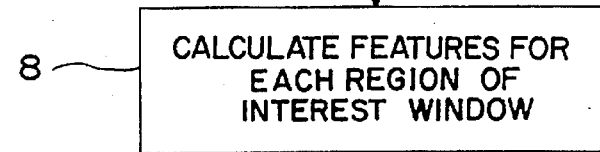
Figure 2:
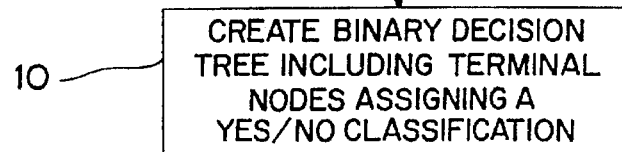
Figure 3:
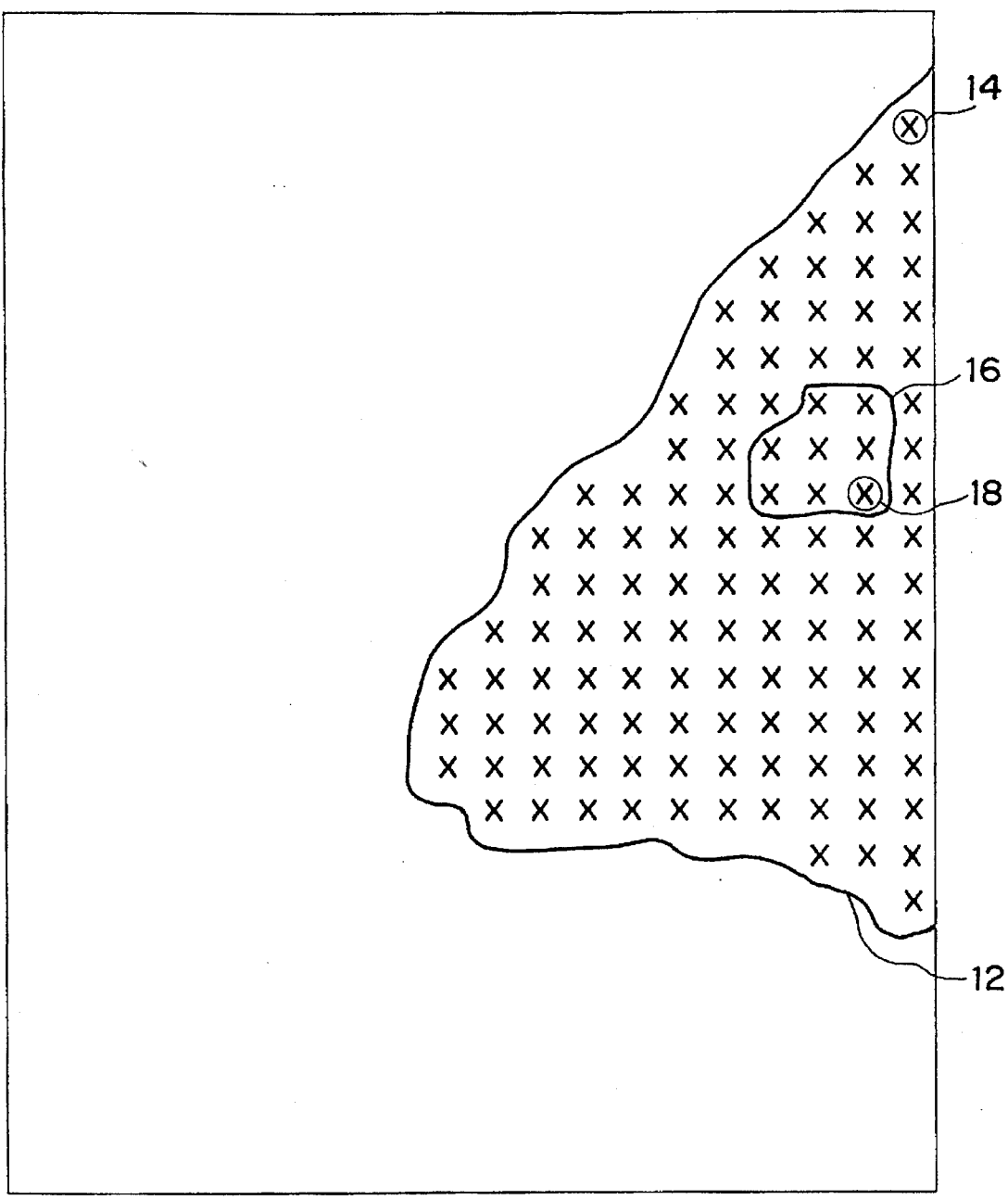
FIG. 3 illustrates an example of image information and specifically, image information of a breast.

As shown in FIG. 3, element 12 illustrates a breast mammogram, including a plurality of picture elements represented by "X". (It should be noted that FIG. 3 contains only about ninety "x"s, representing thousands of pixels in an actual image). In the context of detecting stellate lesions in mammographic data, element 14 of FIG. 3 is used to represent a pixel, known not to contain cancerous information. Further, element 16 illustrates a known stellate lesion in FIG. 3, containing eight picture elements (representing hundreds of actual picture elements) for example, and element 18 in FIG. 3 therefore contains known cancerous information. (Again, it should be noted that actual digitized mammographic data contains thousands of pixels and a stellate lesion contains hundreds of pixels).

The second step, 22 of FIG. 4, is that of acquiring random samples of pixels from each of the reference images. Accordingly, out of the approximately ninety pixels (representing thousands of actual image pixels) shown in FIG. 3, some pixels such as pixel 14 (not contain cancerous information) would be selected and some pixels such as pixel 18 (containing cancerous information) would be selected.

Once the samples are obtained, as described in step three, 24 of FIG. 4, features for the random sampled pixels are then calculated. These features utilized in the present application are preferably that of the ALOE (analysis of local oriented edges, a feature which will be described subsequently in the present application) and the four Laws text features, L5*E5, E5*S5, L5*S5, and R5*R5. In the article entitled "Texture Classification Using Averages of Local Pattern Matches" by Pietikainen et al, in the Proceedings of the Conference on Computer Vision and Pattern Recognition, I.E.E.E., pages 301–303 (1982), which is incorporated herein by reference, the convolution kernels shown to be superior are those of L5*E5, E5*S5, L5*S5, and R5*R5. The size of the window for computation of the sum of absolute values texture energy measure is 15×15 as suggested by Laws in "Textured Image Segmentation", a PHD thesis of K. I. Laws, University of Southern California, 1980, which is incorporated herein by reference.

The Laws texture features are based on the application of a small set of convolution kernels to the image, each kernel designed to respond to a different local behavior, followed by the measurement of various statistics on the convolution images. These kernels and statistics have been refined to the point that it has been shown that the use of four particular convolution kernels, all followed by the computation of local sums of absolute values, work well or better than most other approaches in texture classification problems.

From the plurality of features calculated with regard to each pixel, feature vectors are then formed. A feature vector is simply the collection of features measured on a single pixel and its neighborhood. Thus, the ALOE feature and the four Laws features for a given pixel are collectively referred to as the "feature vector" for that pixel.

Subsequently, in the fourth step, 26 of FIG. 4, the binary decision tree is created from the calculated features and feature vectors from the randomly sampled pixels calculated in the third step, 24 of FIG. 4, in a similar manner to that described previously with regard to the known binary decision tree calculations.

In the fifth step, 28 of FIG. 4, resubstitution error rates are calculated for each of the terminal nodes of the BDT, using features calculated for each of the pixels of each of the reference images, run through the BDT. Thus, resubstitution error rates for the tree nodes are recomputed based on each of the pixels of the reference images, and not just the randomly sampled set used for growing the binary decision trees. The resubstitution error rate with regard to the present application binary decision tree is calculated by dropping feature vectors of each and every pixel of the reference images back through the binary decision tree to compute terminal node classification probabilities for each of the terminal nodes of the binary decision tree, so as to renormalize the resubstitution error rate by noting the number of misclassified feature vectors which fall into each node. This forms a "probability of suspicion" at each terminal node, the "probability" corresponding to the likelihood of containing cancer (or any desired behavior for detection).

In step six, 30 of FIG. 4, a plurality of features are calculated for each of the pixels of digital image data for detection of the desired behavior. Thus, digitized mammographic data is input and for each pixel, a plurality of features are calculated in a manner similar to that stated with regard to the reference images.

In step seven, 32 of FIG. 4, the plurality of features, of each pixel of digital image data for detection of a desired behavior, are input into the binary decision tree. These features are preferably those of the ALOE and Laws texture features as previously described with regard to stellate lesion detection. However, other features may be calculated when detecting another behavior in digital image data. Further, unlike previous systems which sampled only regions of interest in each image, features in the present invention are extracted for every pixel in the digital image data which is being examined, for a "probability of suspicion" of containing a desired behavior, such as a stellate lesion. Accordingly, for each pixel, a five feature representation of the pixel is determined.

Subsequently, in the eighth step, 34 of FIG. 4, a probability or "probability of suspiciousness" is determined for each pixel of the digital image data, of containing the desired behavior. In the detection of stellate lesions, the "probability of suspiciousness" corresponds to the likelihood of a pixel containing a stellate lesion, and this "probability of suspiciousness" is calculated for each pixel. Accordingly, unlike the Yes/No terminal nodes of known binary decision trees, the present application in the eighth step, 34 of FIG. 4, calculates a probability or "probability of suspicion" (based on the resubstitution error rate of each terminal node of each pixel containing a desired behavior that provides information) of the likelihood of each pixel containing the desired behavior. Accordingly, the problem of incorrect interpretation of a pixel is reduced since a terminal node of the binary decision tree contains only a percentage ("probability of suspicion") representing the likelihood of a pixel containing the desired behavior. Thus, the BDT does not make a binary Yes or No decision regarding the pixel containing cancerous information or not containing cancerous information, when detecting the likelihood of a pixel containing a stellate lesion, it instead assigns a "probability of suspiciousness".

Once probabilities are determined for each pixel, a probability image is created. In the present case, with five features being calculated for each pixel, a five dimensional probability image is created. However, the number of features, and the particular features selected should not be considered limiting. Features should be selected based upon the behavior to be detected. A probability image is described as follows.

In the detection of stellate lesions in mammograms, for example, we have a two class problem ("normal" and "suspicious" or likely to contain cancer). The resubstitution error rate of each terminal node of the BDT is converted into a probability of a vector which falls into that node as suspicious. Thus, each pixel in a screening mammogram is converted into a vector of features which is compressed back into a single value, a "probability of suspiciousness", by the BDT. The result is a "probability" image.

Once the probability image is assembled in step eight, 34 of FIG. 4, the probability image is then spacially filtered in the ninth step, 36 of FIG. 4. This is the final step in the actual processing of digital image data, such as that digitized from a mammogram, after conversion of the image to its features and processing each pixel of the digital image data through the binary decision tree to create the probability image. Spatial filtering is used to reduce the probability image to a final report on the presence of stellate lesions, or any other desired feature for detection. The spatial filtering can take place in a plurality of different ways. Two such methods of spatial filtering will be described as follows.

Spatial filtering is necessary to enforce a local consensus. In other words, if a plurality of neighboring pixels in a certain portion of the image are shown to be highly "suspicious", that is they have a high probability of containing cancerous information, and if a pixel in the middle of the surrounding pixels has been determined to have a very low probability of being "suspicious", then the pixel which does not conform with its neighboring pixels most likely contains an incorrect probability. Accordingly, by spatial filtering, a local consensus of neighboring pixels is obtained.

One method of enforcing this local consensus is to initially threshold the probability image, at a level of 0.5, for example, so that all pixels which, more likely than not, are suspicious, are marked as such. Though this is the most intuitative and reasonable of the possible thresholds, it is possible to adjust this value up or down to trade off sensitivity against specificity. Thus, 0.5 is only one example of a possible threshold and thus should not be considered limiting.

The thresholded image can then be median filtered with a window of, for example, 7.5 mm by 7.5 mm in film dimensions, to force the independently classified neighboring pixels to reach a local consensus. The motivation for this size window was that the window should be some small fraction of the ALOE window size (as will subsequently be described) so as not to accidently wipe out the detection of small stellate lesions. Thus, window size should not be considered limiting.

A second method of spatial filtering is that of initially mean filtering a window of pixels. Mean filtering is especially useful for non-binary values and thus operates well on the probability image. Once the mean filtering takes place, the pixels can then be thresholded at 0.5, for example, so that all the pixels that are likely to be suspicious can be marked as such. Accordingly, local consensus of neighboring pixels will be enforced. Again, the threshold of 0.5 should not be considered limiting.

Finally, in the tenth step, 36 of FIG. 4, this spatially filtered probability image can then be output. The spatially filtered probability image can be displayed on a display device, or printed out on a printer, for example. However, such a type of output should not be considered limiting in that any manner of conveying the results and probability of each pixel of digital image data containing the desired behavior can be utilized.

Figure 5:
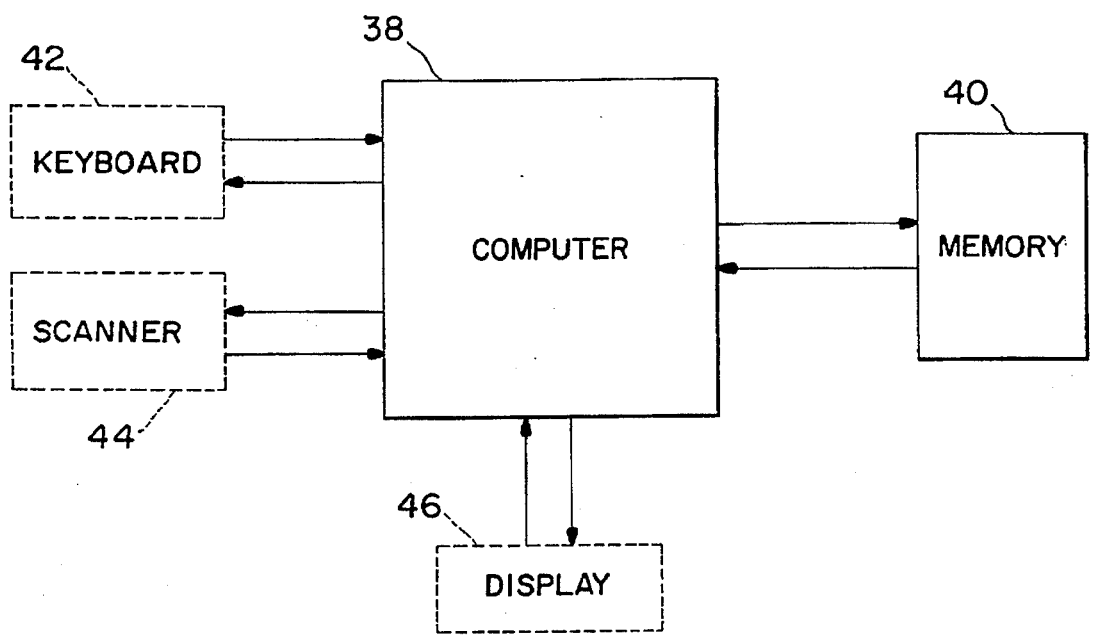
FIG. 5 illustrates an apparatus of the present application.

FIG. 5 illustrates examples of hardware of the present application. Element 38 illustrates a computer and element 40 illustrates a memory. The computer can be any standard personal computer, or computer workstation, for example, and increased computer speed will merely decrease processing time necessary for performing the detection of the desired feature and digital image data on the present apparatus. One such example of such a computer workstation is the Sun SPARCstation-2 computer. The memory preferably contains at least four megabytes of random access memory. This is because training of the binary decision tree will probably require at least this amount of memory. However, as the number of training images increases, the amount of memory which is necessary, increases. Further, the more random sampling which takes place, the more samples are created and the more memory which is needed. For one hundred images, 1000×2000 pixels in size, two thousand samples per image are usually required, for example. Each feature requires four bytes, so the vector of five features in the current embodiment requires twenty bytes per sample. Accordingly, with 100,000 samples needed, four megabytes of random access memory is probably required. In one preferred embodiment, sixty-four megabytes of RAM was used. The application phase, however, is much faster than the training phase and requires less memory.

Also illustrated in FIG. 5 are keyboard 42, scanner 44 and display 46. These are optional components and are not necessarily needed in the practice of the present invention.

However, the keyboard can be used to input information such as digital image data, or it can be used to access information, for example. Also, various programming aspects (preferably done in "C", although this is not limiting) such as varying predetermined sizes of window dimension can be entered and loaded through the keyboard. Further, a display 46 is representative of any output device for conveying resultant information to a user. Thus, other equivalent output devices such as a printer can be used in place of display 46.

In one preferred embodiment, a film mammogram is scanned by the scanner 44 for example, to generate the digitized mammogramic image data. This information can then be directly input to the computer or stored in the memory for subsequent use and subsequent access by the computer. Further, any digitizer, such as DuPont NDT Scan I Film Digitizer can be used, digitizing to a 70 micron revolution, for example, to generate digitized mammographic data. Thus, scanner 44 and keyboard 42 are representative of any input device for inputting digital image data which is to be examined for its probability of containing any desired behavior.

As previously described, in one preferred embodiment of the present application, the aforementioned method for detection of a desired behavior in digital image data utilizes the ALOE feature as one of the features extracted on each of the pixels of reference and digital image data. The ALOE acronym stands for analysis of local oriented edges. ALOE is a feature which can be used in the detection of many desired behaviors or objects in digital image data, but is specifically useful in detection of behaviors or objects exhibiting unique radial qualities such as stellate lesions in digitized mammographic data.

Figure 6:
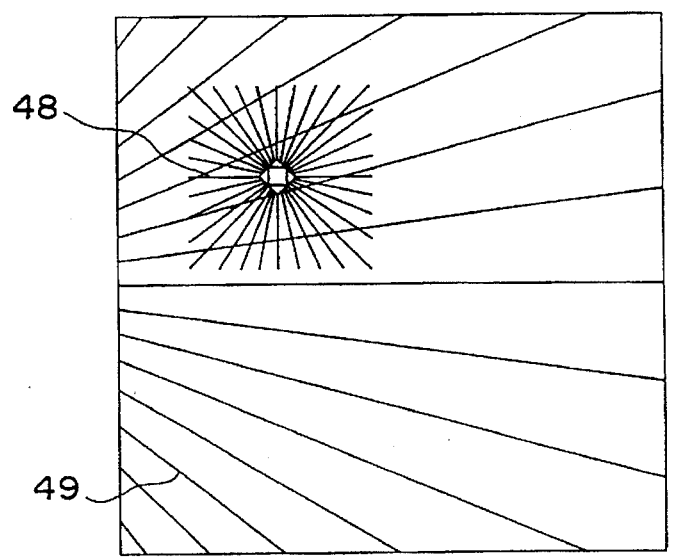
FIG. 6 illustrates a schematic representation of a stellate lesion.

The basic idea of the ALOE feature is keying on architectural distortion, such as that induced by a stellate lesion. A normal mammogram has a duct structure which radiates from the nipple to the chest wall. These radiating lines are shown as element 49 in FIG. 6, for example. The veins and superposition of parenchyma can confuse this tendency, but the primary effect is of a roughly linear pattern. A stellate lesion changes this pattern and creates another center from which rays radiate. Such a pattern of a stellate lesion is shown as element 48 in FIG. 6 of the present application.

To detect such a behavior, one can begin by noting that a primary difference between normal areas and those with stellate lesions is that the suspicious areas will have edges which exist in many different orientations, wherein the normal areas will have edge orientations which are all rather similar. A method of detecting a desired behavior such as a stellate lesion in digital image data, such as a mammogram, will be subsequently discussed with regard to FIG. 7 of the present application.

Figure 7:
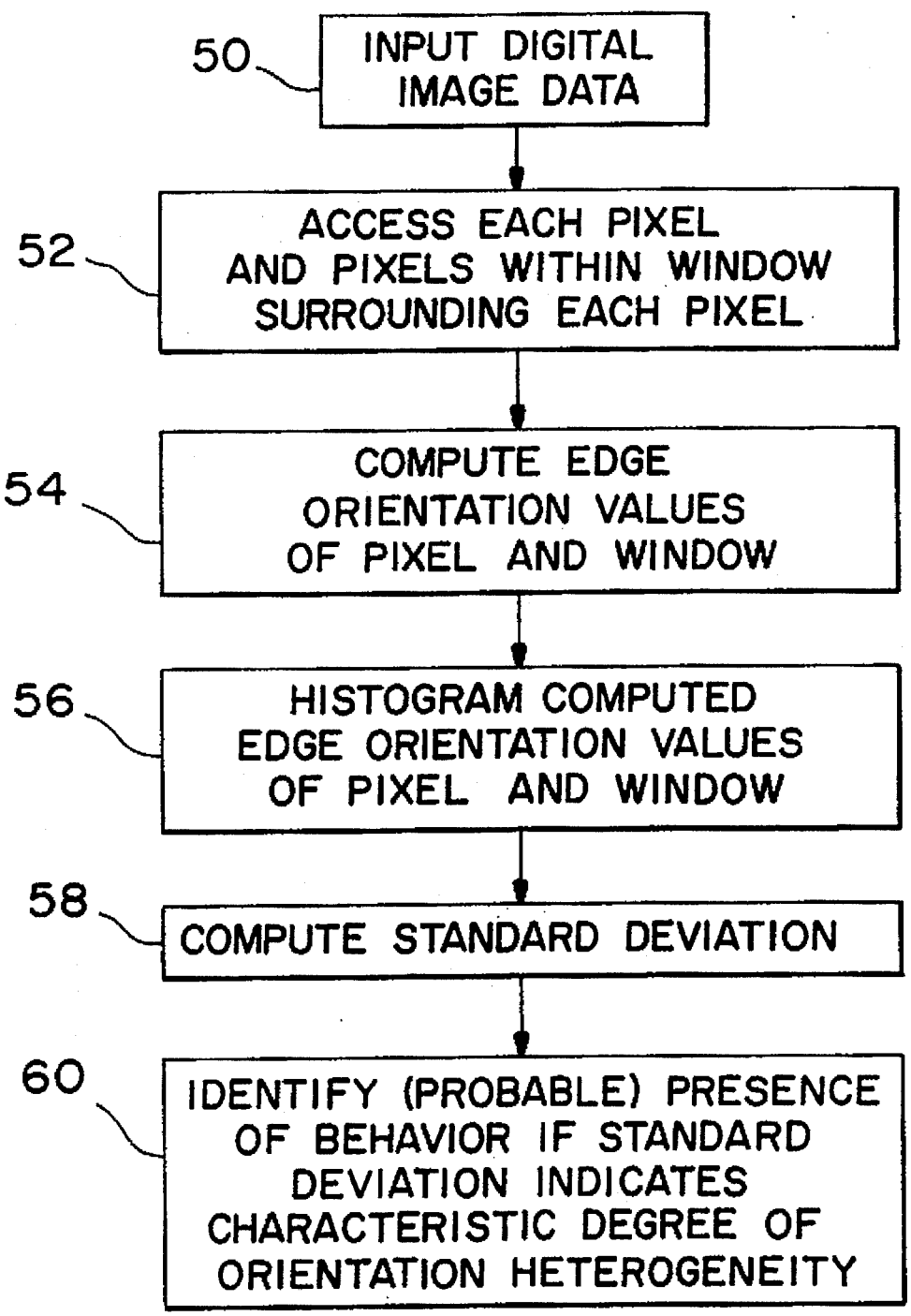
FIG. 7 illustrates a method for analyzing local oriented edges of an image.

Initially, in the first step, 50 of FIG. 7, the digital image data is input. The input digital image data can be that from a scanner for scanning an object such as a breast to obtain a mammogram, can be data directly input through a keyboard, or it can be digitized mammographic data (or any digital image data for examination of a desired behavior) input by any alternate method for subsequent storage in a memory, for example. Next, in the second step, 52 of FIG. 7, digital image data of each pixel and pixels surrounding each pixel, are accessed from the input digital image data. Predetermined window dimensions surrounding each of the plurality of pixels, can be, for example, 30 mm×30 mm. Such a size can be varied and is therefore not limitative, but this size was chosen to be large enough to comfortably encompass all of the stellate lesions in currently available data.

Subsequently, in the third step, 54 of FIG. 7, edge orientation values of each pixel and the pixels within the window surrounding each pixel, are then calculated. There are many ways to calculate these edge orientation values. One method of computing such edge orientation values is by the use of a Sobel edge operator (which is one of the many ways to calculate edge orientation values and thus should not be considered limiting) to generate edge orientation values by computing an arc tangent ratio of vertical and horizontal derivatives of each pixel. These orientation values are then preferably discretized to an eight bit range. In other words, the range of orientations is between 0–2π. This range is then preferably mapped onto a digital range, such as an eight bit range of 1–256. However, the discretizing to an eight bit range should not be considered limiting since the orientation values can be used as they are calculated or discretized to any practical bit range.

In a window on a normal section of mammogram tissue, for example, most edges will be oriented in the same way and so a histogram of the orientations will show a clustered lump. If the window is located at or near a stellate lesion, however, the edges go in all directions and so a histogram will be flatter. Therefore, the fourth step, 56 of FIG. 7, is to histogram the computed edge orientation values of each pixel and pixels within the window surrounding each pixel.

Subsequently, in the fifth step, 58 of FIG. 7, a standard deviation is then computed for each orientation histogram. Measuring standard deviation of the height of each of the histogram bins will capture the "stellateness" of the area, and it is this standard deviation of the orientation histograms which serves as the ALOE feature.

Subsequently, in the sixth step, 60 of FIG. 7, the probable presence of the desired behavior, or stellate lesion, in the digital image data can then be identified. Probable presence of the behavior is identified if the standard deviation indicates a characteristic degree of orientation heterogeneity of the object. This characteristic degree can be that calculated through the BDT of FIG. 4 or can be a characteristic threshold. Thus, in certain technologies such as industrial inspection or texture discrimination, the ALOE feature, alone, can be used to detect a desired behavior in digital image data. In the detection of stellate lesions, however, the best results have been obtained by utilizing the ALOE feature and the four Laws features in conjunction with the BDT to create a probability image.

The ALOE feature indicates a high probability that a pixel contains a stellate lesion if the standard deviation of the orientation histogram is small when detecting a characteristic degree of heterogeneity. Alternately, a characteristic degree of homogeneity can be detected and thus the high probability of a pixel containing a lesion occurs when the standard deviation of the orientation histogram is large. However, it should be noted that when detecting the probable presence of a stellate lesion, or behavior, in digital image data, the ALOE feature is only one of several features examined and the determination of a characteristic degree of orientation heterogeneity is determined by dropping the ALOE feature and the additional features, for each pixel, through the BDT to obtain a probability image. Further, computer statistical analysis can subsequently take place. The analysis can be looking for a high ALOE feature and low Laws features, vice versa, or any combination thereof so as to indicate a characteristic degree of orientation heterogeneity.

Finally, the probable absence or the probable presence of a behavior can be displayed for each of the plurality of pixels. This display, somewhat similar to that previously described, can be any type of output to convey information such as that of a print output or a display output, for example.

The aforementioned methods and apparatuses have been utilized in an experimental atmosphere. The data for the experiment consisted of eighty-five (85) cases comprised of three hundred thirty (330) film images (one hundred sixty-five (165) for training and one hundred sixty-five (165) for testing) from cases collected by the Scott and White Research Clinic. Sixty-six (66) of the selected images contained at least one stellate lesion. The images were digitized to a 70 micron resolution by a DuPont NDT Scan 1 Film Digitizer. The one hundred sixty-five (165) training images were ground truthed by hand, through the interactive placement of circles on the images, each just large enough to cover the lesion and locate it as indicated by the discussion comments provided by the Scott and White Research Clinic. These were converted to binary images so that each training pixel was marked as either normal or suspicious.

Software necessary for this experiment was developed in the computer language "C", and was built upon the RIPPLE and Khoros image processing packages. All experiments were run on a Sun SPARC Station-2 with sixty-four megabytes of RAM. The one hundred sixty-five (165) training images were run through the feature extraction software with the previously discussed window size of the ALOE and Laws texture features and the resulting feature vectors were weeded to 1000 vectors per image. The weeded training vectors were used to grow a binary decision tree and then the entire set of training vectors were run through the tree to recompute the resubstitution error rates of the terminal nodes.

Figure 8:
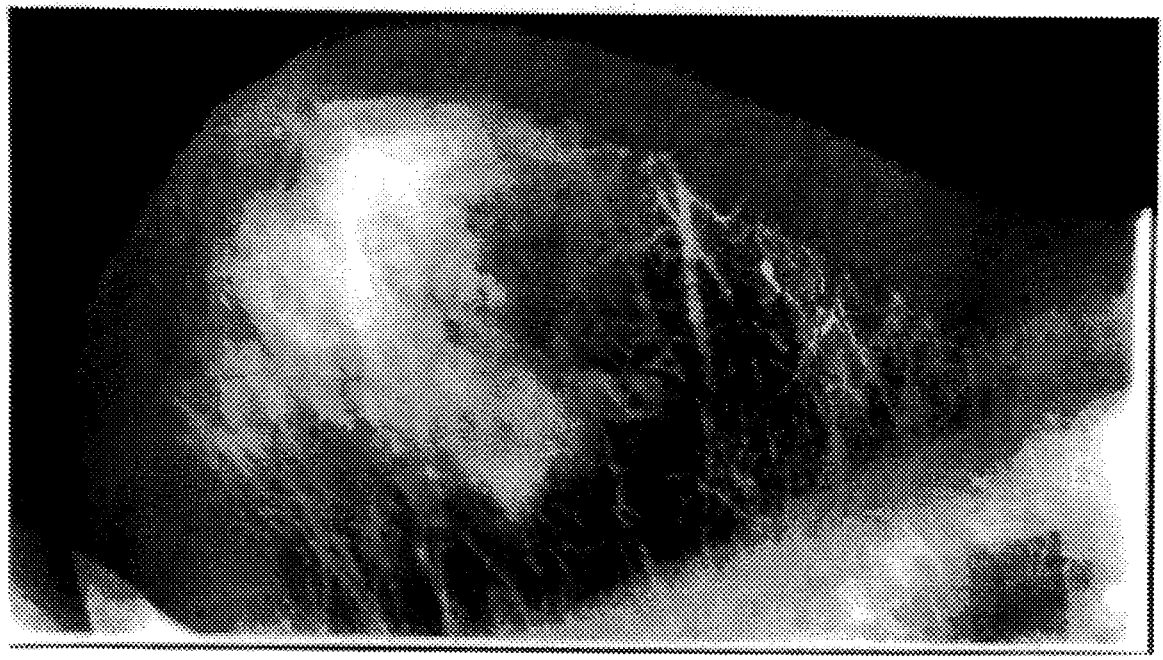
FIG. 8 illustrates input digital image data.
Figure 9:
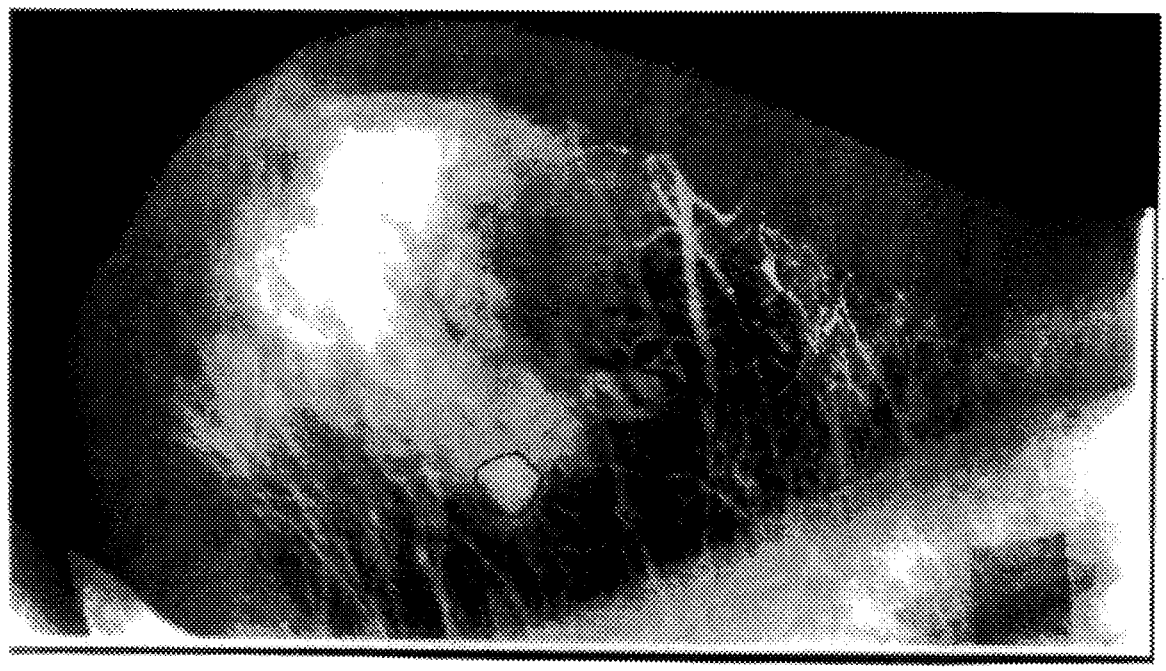
FIG. 9 illustrates processed digital image data.

The one hundred sixty-five (165) test images were similarly treated by the feature extraction algorithms and the test feature vectors for each of the plurality of pixels were dropped, pixel by pixel, into the tree to generate an associated "probability of suspicion". The resulting probability images were spacially filtered and thresholded as previously described. An example of the image analysis results are shown in FIG. 9 of the present application. FIG. 8 illustrates the mammogram with a single stellate lesion which was present and the circular annotation in FIG. 9 indicates the pixels with a probability of suspiciousness greater than 0.5, after mean filtering. As is shown, it is clear that the lesion was cleanly detected and that the algorithm was not fatally distracted by other, apparently similar behavior, in the image.

More to the point were the detection results. Sixty-four (64) of the sixty-six (66) stellate lesions in the test set were detected for a sensitivity of 97%. The specificity of the system worked out to 82%.

Accordingly, throughout the present application, the utility of two image features; ALOE, a new feature designed for the detection of behaviors such as stellate lesions, and the Laws texture energy features, applied for the first time to the problem of detection of normal mammogram tissue, were identified and demonstrated. It was shown that these features can be efficiently integrated by binary decision tree methods that generate "probability of suspiciousness" images, which can in turn be processed by spacial filtering to detect stellate lesions in screening mammograms and can detect any desired behavior in digital image data.

Many other applications, besides the detection of stellate lesions in mammograms, of the system and method of the present invention can take place. A desired behavior, such as an abnormality or an object in an image, can be detected using the ALOE feature alone, or by using the ALOE feature in conjunction with the other features to create a probability image. Use of the ALOE feature alone, to identify a desired behavior based upon a characteristic degree of orientation heterogeneity includes, but is not limited to, industrial applications such as texture discrimination in the quality evaluation of CVD diamond film. Further, areas for use of the system and method of creating a probability image include, but are not limited to, any type of pattern classification or identification of a behavior or object in image data, in fields ranging from medical imaging to military target imaging, for example.

From the above-described embodiments of the present invention, it is apparent that the present invention may be modified as would occur to one of ordinary skill in the art without departing from the scope of the present invention and should be defined solely by the appended claims. Changes and modifications of this system contemplated by the present preferred embodiments will be apparent to one of ordinary skill in the art. Thus, with the invention thus described, it will be obvious that the same may be varied in many ways. Such variations are not to be regarded as a departure from the spirit and scope of the invention and all such modifications as would be obvious to one skilled in the art are intended to be included within the scope of the following claims.

I claim:

1. An apparatus for detecting a desired behavior within digital image data of a plurality of pixels, comprising:

storage means for prestoring a plurality of reference images;

calculating means for calculating a plurality of features for each of a plurality of pixels for each of the reference images;

computing means for creating a binary decision tree from calculated features of random samples of pixels from each of the reference images, said calculating means further calculating a plurality of features for each of the pixels of the digital image data;

input means for inputting each of the plurality of features of each pixel of the digital image data into the binary decision tree;

determining means for determining a probability, corresponding to the likelihood of a presence of the desired behavior, for each of the pixels of the digital image data based upon binary decision tree results to create a probability image;

filtering means for spatial filtering the probability image to enforce local consensus among neighboring pixels within the probability image; and output means for outputting the spatially filtered image, wherein at least one of the plurality of features for each of the pixels of the digital image data is calculated by a calculating means including, accessing means for accessing, for each of a plurality of pixels of the digital image data, digital image data of each pixel and pixels surrounding each of the plurality of pixels in predetermined window dimensions, orientation means for computing edge orientation values of the accessed digital image data, for each of the plurality of pixels, histogramming means for histogramming, for each of the plurality of pixels, the computed edge orientation values, and computing means for computing a standard deviation of each histogram to create a feature for identifying a probable presence of the desired behavior in each of the plurality of pixels in which the standard deviation of the orientation histogram indicates a characteristic degree of orientation heterogeneity.

2. The apparatus of claim 1, wherein the filtering means comprises:

threshold means for thresholding each of the pixels of digital image data based upon each of the determined probabilities; and median filtering means for median filtering windows of pixels, each of the pixels being included in at least one window and each of the windows being of a predetermined size so as to include a plurality of pixels.

3. The apparatus of claim 1, wherein the filtering means comprises:

mean filtering means for mean filtering windows of pixels, based upon each of the determined probabilities, each of the pixels being included in at least one window and each of the windows being of a predetermined size so as to include a plurality of pixels; and thresholding means for thresholding each of the mean filtered pixels of digital image data to enforce the local consensus among neighboring pixels.

4. The apparatus of claim 1, wherein the output means includes a display for displaying the spacially filtered image.

5. The apparatus of claim 1, wherein the determining means determines a probability, for each of the pixels of the digital image data, corresponding to detection of an abnormality.

6. The apparatus of claim 1, wherein the computing means further computes classification probabilities for terminal nodes of the binary decision tree based upon input of the features of each pixel of the references images through the binary decision tree.

7. The apparatus of claim 1, wherein the digital image data is prestored data accessed by the accessing means.

8. The apparatus of claim 1, further comprising input means for inputting the digital image data for subsequent calculation by the calculating means.

9. The apparatus of claim 8, wherein the input means includes a keyboard.

10. The apparatus of claim 8, wherein the input means includes a scanner for scanning an object to create the digital image data.

11. The apparatus of claim 8, wherein the computing means further creates a feature for identifying a probable absence of the desired behavior in each of the plurality of pixels in which the standard deviation of the orientation histogram fails to indicate a characteristic degree of orientation heterogeneity.

12. The apparatus of claim 1, wherein the output means includes a display.

13. The apparatus of claim 1, wherein the output means includes a printer.

14. The apparatus of claim 3, wherein the desired behavior is an abnormality.

15. The apparatus of claim 14, wherein the abnormality is a stellate lesion and the digital image data is digitized mammographic image data.

16. The apparatus of claim 1, wherein the orientation means includes an edge operator to compute edge orientation values.

17. The apparatus of claim 16, wherein the edge operator is a Sobel edge operator which computes an arc-tangent of a ratio of vertical and horizontal derivatives.

18. The apparatus of claim 1, wherein at least one of the features calculated by the calculating means is a Laws texture feature.

19. The apparatus of claim 1, further comprising sampling means for sampling, randomly, a plurality of pixels and for outputting the calculated features of the randomly sampled pixels to the computing means for creation of the binary decision tree.

20. The apparatus of claim 19, wherein at least one of the features calculated by the feature calculating means is a Laws texture feature.

21. A method for detecting a desired behavior within digital image data of a plurality of pixels, the method comprising the steps of:

(a) prestoring a plurality of reference images;

(b) calculating a plurality of features for each of a plurality of pixels for each of the reference images;

(c) creating a binary decision tree from calculated features of random samples of pixels from each of the reference images;

(d) calculating a plurality of features for each of the pixels of the digital image data;

(e) inputting each of the plurality of features of each pixel of digital image data into the binary decision tree;

(f) determining a probability, corresponding to the likelihood of a presence of the desired behavior, for each of the pixels of the digital image data based upon binary decision tree results to create a probability image;

(g) spatial filtering the probability image to enforce local consensus among neighboring pixels within the probability image; and (h) outputting the spatially filtered image, wherein at least one of the plurality of features for each of the pixels of the digital image data is calculated, in at least one of steps (b) and (d), by the substeps of, (i) accessing, for each of a plurality of pixels of the digital image data, digital image data of each pixel and pixels surrounding each of the plurality of pixels in predetermined window dimensions, (ii) computing edge orientation values of the accessed digital image data, for each of the plurality of pixels, (iii) histogramming, for each of the plurality of pixels, the computed edge orientation value, and (iv) computing a standard deviation of each histogram to create a feature for identifying a probable presence of the desired behavior in each of the plurality of pixels in which the standard deviation of the orientation histogram indicates a characteristic degree of orientation heterogeneity.

22. The method of claim 21, wherein step (g) comprises the substeps of:

(i) thresholding each of the pixels of digital image data based upon each of the determined probabilities; and (ii) median filtering windows of pixels, each of the pixels being included in at least one window and each of the windows being of a predetermined size so as to include a plurality of pixels.

23. The method of claim 21, wherein step (g) comprises the substeps of:

(i) mean filtering windows of pixels, based upon each of the determined probabilities, each of the pixels being included in at least one window and each of the windows being of a predetermined size so as to include a plurality of pixels; and (ii) thresholding each of the mean filtered pixels of digital image data to enforce the local consensus among neighboring pixels.

24. The method of claim 21, wherein step (h) of outputting includes displaying the spacially filtered image.

25. The method of claim 21, wherein step (f) determines a probability, for each of the pixels of the digital image data, corresponding to detection of an abnormality.

26. The method of claim 21, further comprising the step of:

computing classification probabilities for terminal nodes of the created binary decision tree of step (c), based upon input of the features of each pixel of the reference images through the binary decision tree.

27. The method of claim 21, wherein the digital image data is accessed prestored data.

28. The method of claim 21, further comprising the substep of:

inputting the digital image data for subsequent calculation.

29. The method of claim 28, wherein the substep of inputting is done through a keyboard.

30. The method of claim 28, wherein the substep of inputting includes the further substep of scanning an object to create the digital image data.

31. The method of claim 28, wherein the computing step further creates a feature for identifying a probable absence of the desired behavior in each of the plurality of pixels in which the standard deviation of the orientation histogram fails to indicate a characteristic degree of orientation heterogeneity.

32. The method of claim 21, wherein the output step (h) includes displaying.

33. The method of claim 21, wherein the output step (h) includes printing.

34. The method of claim 21, wherein the desired behavior is an abnormality.

35. The method of claim 34, wherein the abnormality is a stellate lesion and the digital image data is digitized mammographic image data.

36. The method of claim 21, wherein the substep (ii) of at least one of steps (b) and (d) includes computing edge orientation values with an edge operator.

37. The method of claim 36, wherein the substep (ii) of at least one of steps (b) and (d) includes computing an arctangent of a ratio of vertical and horizontal derivatives with the edge operator which is a Sobel edge operator.

38. The method of claim 21, wherein at least one of the features calculated in at least one of steps (b) and (d) is a Laws texture feature.

39. The method of claim 21, further comprising the steps of:

sampling, randomly, a plurality of pixels of each of the reference images; and outputting a plurality of features for each of the sampled pixels for creation of the binary decision tree in step (c).

40. The method of claim 39, wherein at least one of the features calculated in at least one of steps (b) and (d) is a Laws texture feature.

41. An apparatus for detecting a desired behavior within digital image data of a plurality of pixels, comprising:

storage means for prestoring a plurality of reference images;

calculating means for calculating a plurality of features for each of a plurality of pixels for each of the reference images;

computing means for creating a binary decision tree from calculated features of random samples of pixels from each of the reference images, said calculating means further calculating a plurality of features for each of the pixels of the digital image data;

input means for inputting each of the plurality of features of each pixel of the digital image data into the binary decision tree;

determining means for determining a probability, corresponding to the likelihood of a presence of the desired behavior, for each of the pixels of the digital image data based upon binary decision tree results, to create a probability image;

filtering means for spatial filtering the probability image to enforce local consensus among neighboring pixels within the probability image; and output means for outputting the spatially filtered image, wherein at least one of the plurality of features for each of the pixels of the digital image data is calculated by a calculating means including, accessing means for accessing, for each of a plurality of pixels of the digital image data, digital image data of each pixel and pixels surrounding each of the plurality of pixels in predetermined window dimensions, orientation means for computing edge orientation values of the accessed digital image data, for each of the plurality of pixels, histogramming means for histogramming, for each of the plurality of pixels, the computed edge orientation values, and detecting means for detecting a probable presence of the desired behavior in each of the plurality of pixels for which the orientation histogram indicates a characteristic degree of orientation heterogeneity.

42. The apparatus of claim 41, wherein the detecting means further is for detecting an absence of the desired behavior in each of the plurality of pixels for which the orientation histogram fails to indicate a characteristic degree of orientation heterogeneity.

43. The apparatus of claim 42, further comprising:

indicating means for indicating, for each of the plurality of pixels, the detected probable presence or absence of the desired behavior.

44. A method for detecting a desired behavior within digital image data of a plurality of pixels, the method comprising the steps of:

(a) prestoring a plurality of reference images;

(b) calculating a plurality of features for each of a plurality of pixels for each of the reference images;

(c) creating a binary decision tree from calculated features of random samples of pixels of each of the reference images;

(d) calculating a plurality of features for each of the pixels of the digital image data;

(e) inputting each of the plurality of features of each pixel of digital image data into the binary decision tree;

(f) determining a probability, corresponding to the likelihood of a presence of the desired behavior, for each of the pixels of the digital image data based upon binary decision tree results to create a probability image;

(g) spatial filtering the probability image to enforce local consensus among neighboring pixels within the probability image; and (h) outputting the spatially filtered image, wherein at least one of the plurality of features for each of the pixels of the digital image data is calculated, in at least one of steps (b) and (d), by the substeps of, (i) accessing, for each of a plurality of pixels of the digital image data, digital image data of each pixel and pixels surrounding each of the plurality of pixels in predetermined window dimensions, (ii) computing edge orientation values of the accessed digital image data, for each of the plurality of pixels, (iii) histogramming, for each of the plurality of pixels, the computed edge orientation values; and (iv) detecting a probable presence of the desired behavior in each of the plurality of pixels for which the orientation histogram indicates a characteristic degree of orientation heterogeneity.

45. The method of claim 44, wherein the identifying substep step (iv) further includes detecting an absence of the desired behavior in each of the plurality of pixels for which the orientation histogram fails to indicate a characteristic degree of orientation heterogeneity.

46. The method of claim 44, further comprising the substep of:

(v) indicating, for each of the plurality of pixels, the detected probable presence or absence of the desired behavior.

* * * * *